United States Patent
Silva et al.

(10) Patent No.: US 12,462,551 B2
(45) Date of Patent: *Nov. 4, 2025

(54) TRACKING OBJECTS WITH CHANGING APPEARANCES

(71) Applicant: Deere & Company, Moline, IL (US)

(72) Inventors: Daniel Ribeiro Silva, San Jose, CA (US); Jinmeng Rao, Sunnyvale, CA (US)

(73) Assignee: DEERE & COMPANY, Moline, IL (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/384,642

(22) Filed: Oct. 27, 2023

(65) Prior Publication Data

US 2024/0054776 A1    Feb. 15, 2024

Related U.S. Application Data

(63) Continuation of application No. 17/558,928, filed on Dec. 22, 2021, now Pat. No. 11,836,970.

(51) Int. Cl.
*G06V 10/84* (2022.01)
*G06V 10/75* (2022.01)
(Continued)

(52) U.S. Cl.
CPC ............ *G06V 10/84* (2022.01); *G06V 10/757* (2022.01); *G06V 10/82* (2022.01); *G06V 20/68* (2022.01)

(58) Field of Classification Search
CPC ........ G06V 10/84; G06V 20/68; G06V 10/82; G06V 10/757
See application file for complete search history.

(56) References Cited

U.S. PATENT DOCUMENTS

2022/0004919 A1\* 1/2022 Zhang ................. G06F 18/2431
2023/0196754 A1   6/2023 Silva et al.

OTHER PUBLICATIONS

Halstead et al, "Fruit Quantity and Ripeness Estimation Using a Robotic Vision System", 2018, IEEE Robotics and Automation Letters, vol. 3, No. 4, pp. 2995-3002 (8 Pages) (Year: 2018).\*

(Continued)

*Primary Examiner* — David F Dunphy
(74) *Attorney, Agent, or Firm* — HANLEY, FLIGHT & ZIMMERMAN, LLC (57) ABSTRACT

Implementations are described herein for tracking objects with changing appearances across temporally-disparate images. In various implementations, a first probability distribution over a plurality of classes may be determined for a first biological object depicted in a first image captured at a first point in time. The classes may represent stages of growth of biological objects. Additional probability distribution(s) over the plurality of classes may be determined for candidate biological object(s) depicted in a second image captured at a second point in time subsequent to the first point in time. The candidate biological object(s) may potentially match the first biological object depicted in the first image. Based on a time interval between the first and second points in time, the first probability distribution may be compared to the probability distribution(s) of the candidate biological object(s) depicted in the second image to match one of the candidate biological object(s) depicted in the second image to the first biological object depicted in the first image.

20 Claims, 7 Drawing Sheets

(51) Int. Cl.
*G06V 10/82* (2022.01)
*G06V 20/68* (2022.01)

(56) References Cited

OTHER PUBLICATIONS

Halstead, et al; Fruit Quantity and Ripeness Estimation Using a Robotic Vison System; JEEE Robotics and Automation Letters; vol. 3, No. 4; pp. 2995-3002; dated 2018.
Bose et al., "Multi-class object tracking algorithm that handles fragmentation and grouping" MIT Computer Science and Artificial Intelligence Laboratory. 8 pages.
Tang et al., "Recognition and Localization Methods for Vision-Based Fruit Picking Robots: A Review" Frontiers in Plant Science. vol. 11, Article 510. May 2020, 17 pages.
Radke et al., "Image Change Detection Algorithms: A Systematic Survey" IEEE Transactions on Image Processing, vol. 14, No. 3. Mar. 2005. 14 pages.
Liu et al., "Robust Fruit Counting: Combining Deep Learning, Tracking, and Structure from Motion" arXiv:1804.00307v2 [cs.CV] dated Aug. 2, 2018. 8 pages.
Dzyubachyk et al., "Advanced Level-Set Based Multiple-Cell Segmentation and Tracking in Time-Lapse Fluorescence Microscopy Images" Biomedical Imaging Group Rotterdam Erasmus MC. 4 pages.
Dufour et al., "3D Active Meshes: fast discrete deformable models for cell tracking in 3D time-lapse microscopy" IEEE Transactions on Image Processing. 13 pages.
Sa et al., "DeepFruits: A Fruit Detection System Using Deep Neural Networks" Sensors 2016, 16, 1222; doi. 10.3390/s16081222. 23 pages.
Xinchao Wang, "Tracking Interacting Objects in Image Sequences" Lausanne, Jun. 2015. 164 pages.

\* cited by examiner

TRACKING OBJECTS WITH CHANGING APPEARANCES

BACKGROUND

Objects may be tracked across multiple images (or frames) in various ways. In some cases, techniques such as bipartite graph matching may be employed to match one or more objects depicted in a first image with the same object(s) depicted in another image. Object tracking is often employed to track objects that either themselves move as multiple images are captured, or that are viewed from different perspectives across multiple images. While these objects may vary spatially across images, the objects themselves are usually relatively static in appearance.

SUMMARY

Implementations are described herein for tracking objects with changing appearances across temporally-disparate images. More particularly, but not exclusively, techniques are described herein for tracking biological objects that evolve, grow, or otherwise transition among different visual appearances between acquisition of images depicting those biological objects. Techniques described herein allow for the same biological object, such as a fruit, nut, berry, flower, or other plant-part-of-interest, to be tracked across two or more digital images that are captured days or even weeks apart, regardless of the object's changing appearance. Consequently, it is possible to localize that biological object over a relatively long period of time for purposes such as monitoring and/or predicting the biological object's growth, health, yield, etc.

In various implementations, a method may be implemented using one or more processors and may include: determining a first probability distribution over a plurality of classes of a first biological object depicted in a first image captured at a first point in time, wherein the plurality of classes represent stages of growth of biological objects; determining one or more additional probability distributions over the plurality of classes of one or more candidate biological objects depicted in a second image, wherein the one or more candidate biological objects depicted in the second image potentially match the first biological object depicted in the first image, and wherein the second image is captured at a second point in time subsequent to the first point in time; based on a time interval between the first and second points in time, comparing the first probability distribution of the first biological object to the one or more probability distributions of the one or more candidate biological objects depicted in the second image; and based on the comparing, matching a given biological object of the one or more candidate biological objects depicted in the second image to the first biological object depicted in the first image.

In various implementations, determining the probability distribution over the plurality of classes of the first biological object may include applying at least a portion of the first image as input across a probability distribution classifier (PDC) machine learning model to generate the probability distribution over the plurality of classes. In various implementations, the PDC machine learning model may be trained based at least in part using a temporal sequence of images capturing a reference biological object, wherein a subset of keyframes selected from the temporal sequence are manually labeled with probability distributions over the plurality of classes, and images of the temporal sequence other than the keyframes in the subset are labeled automatically using interpolation based on timestamps of the keyframes and other images.

In various implementations, the method may include predicting a subsequent probability distribution over the plurality of classes of the first biological entity after the time interval based on the probability distribution over the plurality of classes of the first biological object. In various implementations, the matching may be based on a comparison of the predicted subsequent probability distribution with the one or more probability distributions of the one or more candidate biological objects depicted in the second image.

In various implementations, the comparing may include processing the probability distribution of the first biological object based on the time interval using a probability distribution predictor (PDP) machine learning model, wherein the PDP machine learning model is trained to map temporally disparate probability distributions of biological objects to each other based on time intervals between the temporally disparate probability distributions. In various implementations, the PDP machine learning model may be a recurrent neural network or a transformer network. In various implementations, the biological objects may include fruits, flowers, or berries, and the plurality of classes include two or more of flowering, ripening, growing, or branching.

In addition, some implementations include one or more processors (e.g., central processing unit(s)(CPU(s)), graphics processing unit(s)(GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A and FIG. 23 schematically depict examples of temporally-disparate images across which techniques described herein may be used to track biological objects, in accordance with various implementations.

DETAILED DESCRIPTION

Implementations are described herein for tracking objects with changing appearances across temporally-disparate images. More particularly, but not exclusively, techniques are described herein for tracking biological objects that evolve, grow, or otherwise transition among different visual appearances between acquisition of images depicting those biological objects. Techniques described herein allow for the same biological object—e.g., a plant-part-of-interest such as a fruit, nut, berry, flower—to be tracked across two or more digital images that are captured days or even weeks apart, regardless of the object's changing appearance. Consequently, it is possible to localize that biological object over a relatively long period of time for purposes such as monitoring and/or predicting the biological object's growth, health, yield, etc.

In various implementations, object recognition processing may be performed on a first image that was captured at a first point in time and on a second image that was captured at a second point in time subsequent to the first point in time. Based on the object recognition processing performed on the first image, a first biological object may be detected in the first image. Based on the object recognition process performed on the second image, one or more candidate biological objects that potentially match (i.e., are the same as) the first biological object may be detected.

A time interval between the first and second points in time may be large enough (e.g., days, weeks) to allow for an appearance of a biological object depicted in the first and second images to change. Accordingly, based on the time interval between acquisition of the first and second images, one of the candidate biological objects detected in the second image may be matched to the first biological object depicted in the first image based at least in part on the matching candidate biological object being most closely aligned with a predicted appearance of the first biological object after passage of the time interval. Other signals may also be used to match the biological objects, such as their absolute locations, spatial contexts (e.g., locations relative to other biological or non-biological objects), and so forth.

In some implementations, the object recognition processing may include determining probability distributions over a plurality of classes for biological objects depicted in the first and second images. In other implementations, the object recognition processing may be performed first, e.g., to provide a bounding box annotation around each plant-part-of-interest. Then, probability distributions over the plurality of classes for each of the detected objects may be calculated, avoiding unnecessary processing of other portions of the images. These probability distributions, which may or may not be normalized, may be alternatively referred to and/or considered as "transition representations," e.g., numeric representations of a biological object's state relative to a plurality of growth stages.

The plurality of classes of a biological object may include, for instance, visually-distinguishable stages of growth, evolution, or transition of the biological object. With a strawberry, for instance, one class may be "pre-flower," another class may be "flowering," another class may be "white_strawberry," and yet another class may be "red_strawberry" or "ripe_strawberry." A respective probability distribution over the plurality of classes may be determined for each of the biological objects detected in the first and second images. The first biological object detected in the first image may then be matched to one of the candidate biological objects detected in the second image based at least in part on a comparison of the probability distribution assigned to the first biological object depicted in the first image and the probability distribution(s) of the candidate biological object(s) depicted in the second image.

In various implementations, a probability distribution classifier (PDC) machine learning model may be trained to determine the probability distributions of the biological objects. In some such implementations, the PDC machine learning model may take the form of a convolutional neural network (CNN) that is trained to process images to detect a biological object and calculate its probability distribution over the plurality of classes. For example, training images labeled with human-curated probability distributions may be used to train the CNN.

However, obtaining human-curated training images can be costly and/or cumbersome. Accordingly, in some implementations, what will be referred to herein as "keyframe" images (or simply "keyframes") may be selected from a temporal sequence of images depicting an individual plant (or a plant-part-of-interest). These keyframe images may constitute every xth (positive integer) image, such as every tenth image, every 30th image, etc., and/or may be images that are selected because they depict occurrence of some event (e.g., movement from an insect eating a fruit) or are capable of manual labeling with a high degree of confidence. Keyframe images may be labeled manually with probability distributions. The other non-keyframe images are not labeled manually, but instead are labeled using interpolation based on their associated timestamps. These manually-labeled and automatically-labeled images may then be used to train the PDC machine learning model. Similar techniques may be applied where keyframe images are sparse, e.g., because acquiring images frequently may be cumbersome and/or impractical.

In various implementations, a probability distribution predictor (PDP) machine learning model may be trained to predict subsequent probability distributions of biological objects based on earlier probability distributions (or vice versa). These subsequence probability distributions may then be used to determine which candidate biological object depicted in the second image has the assigned probability distribution that is most similar to what would be expected of the first biological object depicted in the first image. In some such implementations, the PDP machine learning model may take the form of a recurrent neural network (RNN), long short-term memory (LSTM) network, gated recurrent unit (GRU) network, etc. Other models capable of processing sequence may also be employed as the PDP model, such as Bidirectional Encoder Representations from Transformers (BERT) transformer models.

Figure 1:
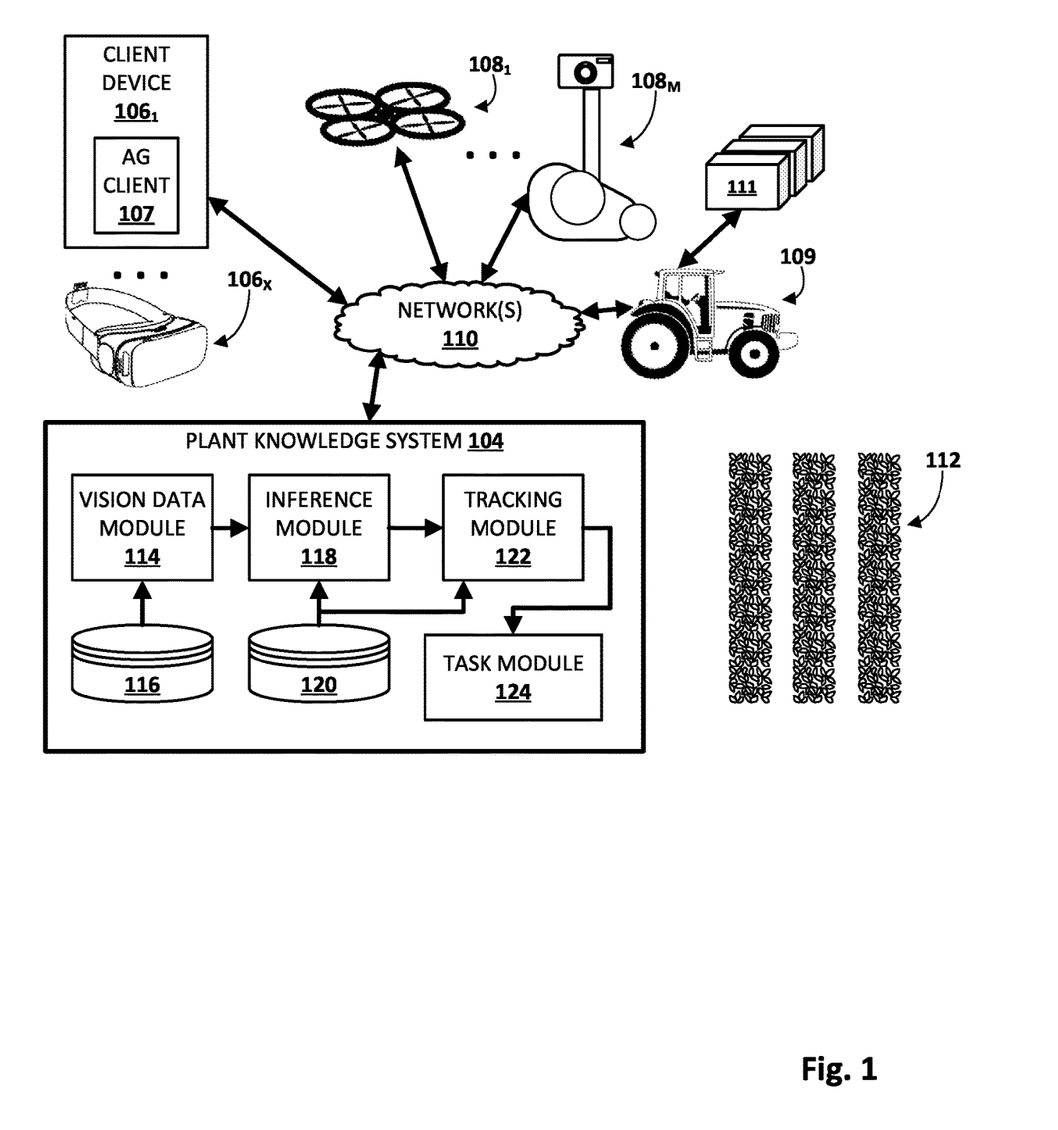
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more crop fields, one or more plots, one or more gardens, one or more greenhouses, or any other areas in which there may be an interest or desire to automatically detect, classify, and/or track particular types of biological objects over time. As one non-limiting example, the visual appearances of various plant-parts-of-interest such as fruits may change over time depending on natural (e.g., environmental) and/or human-induced conditions. These changing appearances may be monitored for a variety of purposes, such as crop yield prediction, agricultural task recommendation, etc.

An individual (which in the current context may also be referred to as a "user") may operate one or more client devices $106_{1-X}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HM D") $106_X$ that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction and diagnosis, either of which may include tracking plant-parts-of-interest that change in appearance over time. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, a task module 124 (described in more detail below) may generate a report, a map, instructions, and/or any other data that may be presented to an operator of a client device using a graphical user interface, audibly, etc. These data may inform the agricultural personnel of locations of targeted plants such as plants ready for harvest (e.g., by way of pixel-wise annotations or bounding boxes that capture these plants), what action(s) should be taken on those plants, a timeframe in which those action(s) should be taken, etc.

In some implementations, one or more robots $108_{1-M}$ and/or other agricultural vehicles 109 may be deployed and/or operated to perform various agricultural tasks. Performance of some of these tasks, including but not limited to harvesting, trimming, pruning, sucker/bud removal, etc., may be performed based on output generated using machine learning model(s) trained as described herein to track and/or localize individual plants, or individual plant-parts-of-interest, over time. An individual robot $108_{1-M}$ may take various forms, such as an unmanned aerial vehicle $108_1$, a robot (not depicted) that is propelled along a wire, track, rail or other similar component that passes over and/or between crops, a wheeled robot $108_M$, or any other form of robot capable of being propelled or propelling itself past crops of interest.

In some implementations, different robots may have different roles, e.g., depending on their capabilities. For example, in some implementations, one or more of robots $108_{1-M}$ may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, etc.

In addition to or instead of robots, in some implementations, agricultural vehicles 109 such as the tractor depicted in FIG. 1, center pivots, boom sprayers (which may be affixed to tractors or other agricultural vehicles), threshers, etc. may be leveraged to acquire image data. For example, one or more modular computing devices 111 (also referred to as "sensor packages") may be mounted to agricultural vehicle 109 and may be equipped with one or more vision sensors that capture images of crops. These images and/or images captured by robots may be processed using machine learning models described herein to track and/or localize individual plants and/or individual plant-parts-of-interest over temporally-disparate images.

In various implementations, plant knowledge system 104 may be implemented across one or more computing systems that may be referred to as the "cloud." Plant knowledge system 104 may receive vision data generated by robots $108_{1-M}$, modular computing devices 111, and/or agricultural personnel and process it using various image processing techniques to perform tasks such as tracking biological objects (e.g., individual plants, plant-parts-of-interest) across temporally-disparate images. In various implementations, plant knowledge system 104 may include a vision data module 114, an inference module 118, a tracking module 122, and the aforementioned task module 124. In some implementations one or more of modules 114, 118, 122, 124 may be omitted, combined, and/or implemented in a component that is separate from plant knowledge system 104.

Plant knowledge system 104 may also include one or more databases. For example, plant knowledge system 104 may include, in communication with vision data module 114, an imagery database 116 for storing image data captured by, for instance, agricultural personnel, modular computing device(s) 111, and/or one or more robots $108_{1-M}$. Plant knowledge system 104 may also include a machine teaming model database 120 that includes one or more machine learning models that are trained as described herein to detect diseased plants and/or plant disease. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as modular computing device(s) 111 and/or robots $108_{1-M}$. Vision data module 114 may then provide these imagery data to inference module 118. In other implementations, vision data module 114 may be omitted and the functions described herein as being performed by vision data module 114 may be performed by other components of plant knowledge system 104, such as inference module 118.

Inference module 118 may be configured to process imagery received from vision data module 114 using various machine learning models stored in machine learning model database 120 to generate output. This output may be indicative of various information, such as phenotypic traits, probability distributions of biological objects over multiple classes, and so forth. To this end, one or more machine learning models stored in database 120 may be trained to track biological objects with appearances that change over time across temporally-disparate images, such as two-dimensional digital images of agricultural area(s) 112 captured by modular computing device(s) 111 and/or by robot(s) 108.

Various types of machine teaming models may be trained for use in tracking biological objects such as individual plants and/or individual plant-parts-of-interest across imagery data captured over periods of time such as days, weeks, or even months (or seconds/minutes/hours for biological objects with appearances that change quickly). In some implementations, a probability distribution classifier (PDC) such as a CNN may be trained to generate output indicative of probability distributions of biological objects across multiple classes, with each class representing a different visual state of the biological object. In FIG. 1, for instance, inference module 118 generates annotated image(s) (not depicted) that include pixel-wise annotations or bounding boxes, as well as predicted probability distributions of biological objects over multiple classes.

Tracking module 122 may be configured to track changing biological objects across images at temporally-disparate points in time, such as days or even weeks apart. The biological objects tracked by tracking module 122 may be those that are annotated with probability distributions by inference module 118. In various implementations, tracking module 122 may compare a probability distribution of a first biological object detected in a first image to one or more probability distributions of one or more candidate biological objects depicted in a second image captured some time interval after the first image. Based on this comparison, tracking module 122 may match a given biological object of the one or more candidate biological objects depicted in the second image to the first biological object depicted in the first image.

In various implementations, the comparison performed by tracking module 122 may be based on the time interval between capture of the first and second images. For example, the probability distribution over the plurality of classes assigned the first biological object at the time the first image is captured may be used to predict a subsequent probability distribution of the first biological object after the time interval. This predicted subsequent probability distribution may then be compared with the one or more observed (e.g., detected based on the second image alone) probability distributions of the one or more candidate biological objects depicted in the second image. In various implementations, the candidate biological object having the observed probability distribution that is most similar to the predicted subsequent probability distribution may be selected as a match to the first biological object.

Task module 124 may be configured to perform actions based on the annotated images 122, as well as the biological objects that are depicted in those images and tracked by tracking module 122. For example, in some implementations, task module 124 may deploy one or more robots 108 to take action on the particular plants, such as pruning those plants, applying pesticides and/or fungicides, harvesting plant-parts-of-interest (e.g., fruits, flowers, etc.), and so forth. In some implementations, task module 124 may provide output that includes, for instance, instructions of how to act upon individual plants and/or a map of those individual plants.

In some implementations, one or more components of plant knowledge system 104 may be implemented in whole or in part on a robot 108. For example, inference module 118 and/or tracking module 122 may be implemented in whole or in part on a robot 108 that is also equipped with a vision sensor such as a two-dimensional camera. By having modules 118/122 onboard, robot 108 may be able to process its own images so that it can quickly track plant-parts-of-interest across temporally-disparate images. Robot 108 may also include its own task module 124 that enables robot 108 to take various actions, such as pruning, harvesting, irrigating, treating, etc.

Figure 2A:
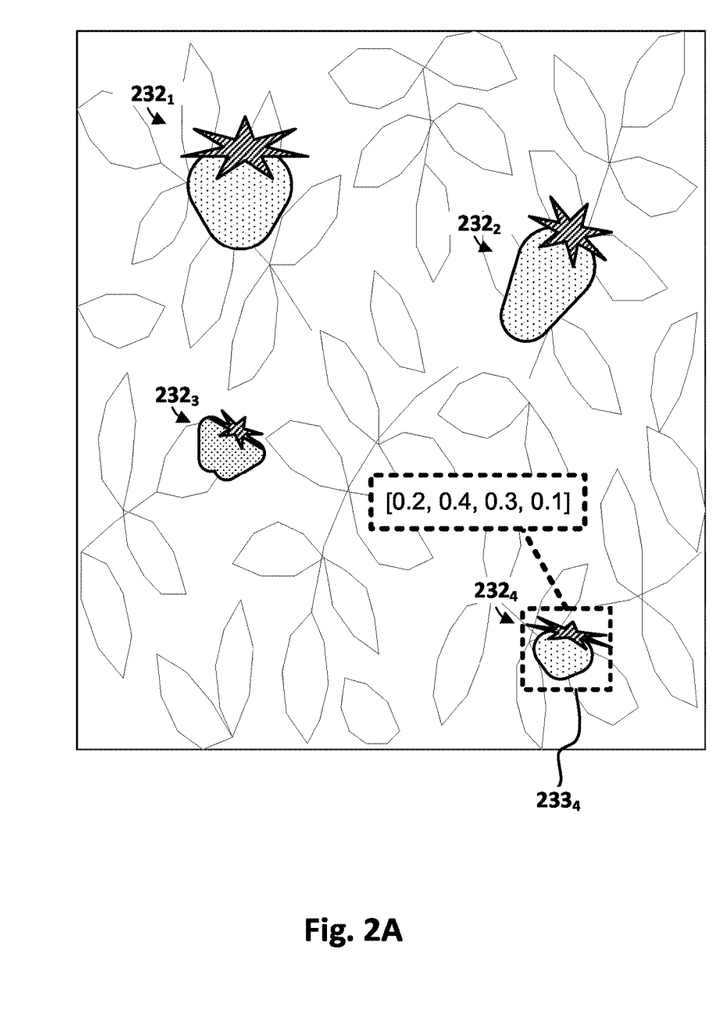
Figure 2B:
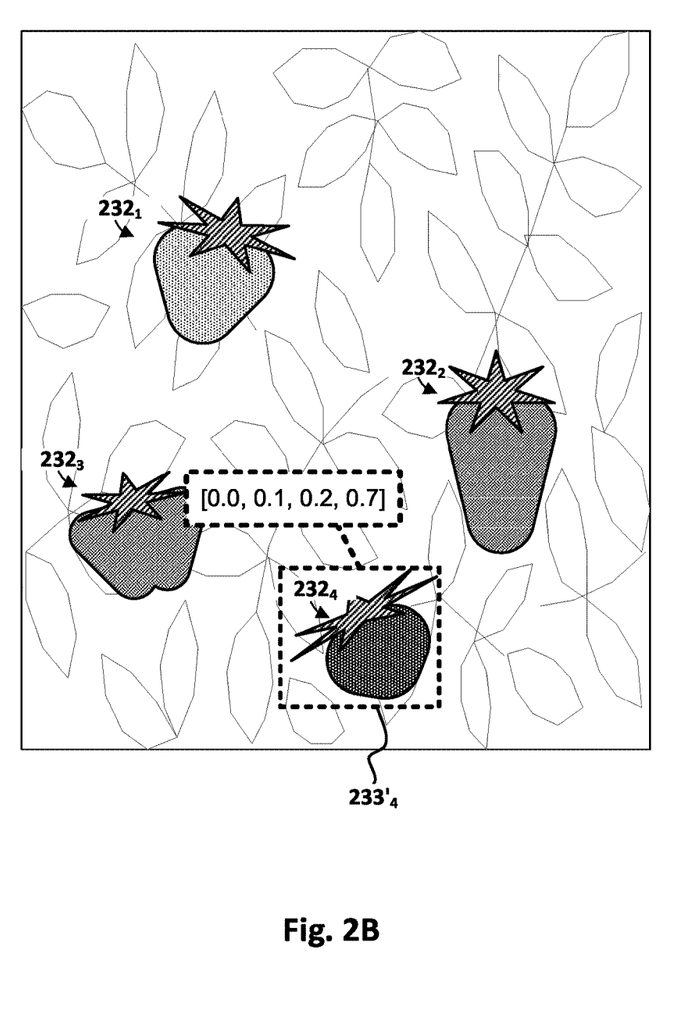

FIGS. 2A and 2B illustrate temporally-disparate images that depict the same biological objects at different points in time, such that the biological objects' appearances have changed. In this example, four strawberries $232_{1-4}$ are depicted, but techniques described herein may be used for any biological entity with an appearance that changes over time, such as other plant-parts-of-interest, whole plants, animals, insects, microorganisms, cells, etc.

In FIG. 2A, strawberries $232_{1-4}$ are lightly shaded relative to FIG. 2B to illustrate that when the first image of FIG. 2A was captured, strawberries $232_{1-4}$ are in an earlier stage of development than when the second image of FIG. 2B was captured. For example, strawberries may begin as flowers, then transition into green strawberries, then white strawberries, before they ultimately ripen into red strawberries. It is also evident that strawberries $232_{1-4}$ in FIG. 2B are larger than in FIG. 2A, indicating growth over time.

These stages of growth may be captured in multiple classes that can be assigned to strawberries $232_{1-4}$, e.g., by inference module 118 using a PDC machine learning model (e.g., CNN) trained on images of strawberries labeled with probability distributions across the multiple classes. For example, in FIG. 2A, fourth strawberry $232_4$ is annotated with a bounding box $233_4$. The other strawberries $232_{1-3}$ are not annotated merely for the sake of simplicity and clarity. Bounding box $233_4$ itself includes an additional annotation that conveys a probability distribution of fourth strawberry $232_4$ across four distinct classes: "flower," "green," "white," and "ripe." These class names are not meant to be limiting—for example, "ripe" could just as easily be called "red." Moreover, the fact that some of the class names are colors is not meant to be limiting. Numerous factors may be accounted for (e.g., learned by the PDC) when assigning biological objects to classes. For example, labeled training data depicting strawberries would also likely capture, and therefore "bake" into a PDC, strawberry sizes, shapes, distribution and/or numbers of achenes, etc.

In FIG. 2A, bounding box $233_4$ includes a probability distribution of [0.2, 0.4, 0.3, 0.1], which may convey that fourth strawberry $232_4$ has a 0.2 probability of being a member of the "flower" class, a 0.4 probability of being a member of the "green" class, a 0.3 probability of being a member of the "white" class, and a 0.1 probability of being a member of the "ripe" class. These probabilities suggest that fourth strawberry $232_4$, if rendered in color, would appear a little greener than white, and would share more visual characteristics with canonically-green strawberries than with canonically-white strawberries.

In the image of FIG. 2B, which as noted above was captured sometime after the capture of the image in FIG. 2A, strawberries $232_{1-4}$ are not only larger, but are noticeably lower in the frame, e.g., due to their having greater mass, and thus, sagging farther down the strawberry plant. However, techniques are not limited to being practiced on images captured from the same, or even similar vantage points. Techniques described herein may be used to track a biological entity across frames that may be vastly different, e.g., captured from different perspectives, using different vision sensors and/or vision sensor settings (e.g., zoom, resolution, aperture size, exposure time, etc.).

In FIG. 2B, fourth strawberry $232_4$ is once again annotated with a bounding box $233'_4$. This time, the probability distribution assigned to fourth strawberry $232_4$, e.g., by inference module 118 using the same PDC as before, is [0.0, 0.1, 0.2, 0.7]. This may convey that fourth strawberry $232_4$ now has a 0.0 probability of being a member of the "flower" class, a 0.1 probability of being a member of the "green" class, a 0.2 probability of being a member of the "white" class, and a 0.7 probability of being a member of the "ripe" class. In other words, it is highly likely that fourth strawberry $232_4$ is ripe, as indicated by its dark shading.

Figure 3:
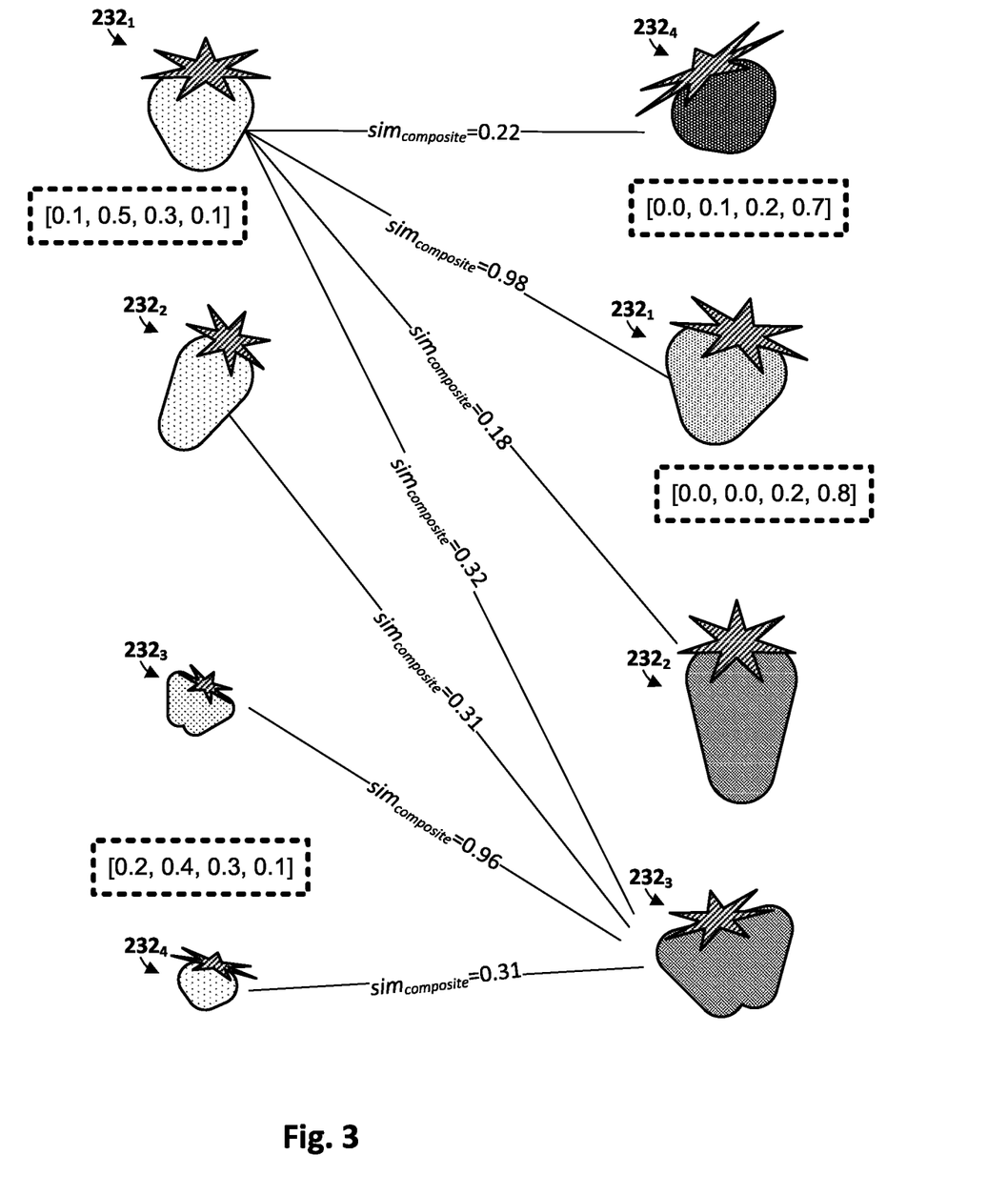
FIG. 3 schematically depicts an example of how bipartite graph matching can be leveraged with techniques described herein.

FIG. 3 depicts an example of how tracking module 122 may use bipartite graph matching (e.g., using the Hungarian algorithm) in order to match biological objects—namely, the strawberries $232_{1-4}$ depicted in FIGS. 2A-B—between the temporally-disparate images depicted in FIGS. 2A-B using probability distributions. With the Hungarian algorithm, for instance, all objects on the left may be compared to all objects on the right simultaneously. Techniques other than bipartite graph matching may be employed in other implementations. For example, in some implementations, an ensemble of machine learning models, such as a PDC and one or more RNNs (or variants of RNNs), may be employed to detect biological objects, calculate probability distributions of biological objects, and to predict temporally-disparate probability distributions (subsequent or in the past).

The same strawberries $232_{1-4}$ are depicted on the left side of FIG. 3 as were depicted in FIG. 2A. Similarly, the same strawberries $232_{1-4}$ are depicted on the right side of FIG. 3 as were depicted in FIG. 2B. Accordingly, strawberries 23214 on the right may be thought of as candidate matches to the strawberries $232_{1-4}$ on the left. While edges may be computed between each strawberry on one side with each strawberry on the other, for the sake of clarity and simplicity, a subset of edges are depicted in FIG. 3. This subset includes the edges between first strawberry $232_1$ on the left and all strawberries on the right, as well as a few other selected edges.

In this example, first strawberry $232_1$ on the left is connected to each strawberry on the right via an edge denoted "$sim_{composite}$" to denote a composite similarity score. This composite similarity score may be computed between each pair of strawberries connected by an edge based on one or more signals/inputs. In various implementations, the composite similarity score may be computed based at least in part on a similarity between an observed probability distribution over the multiple classes assigned to the right-hand strawberry of the pair of strawberries connected by the edge, and a predicted subsequent probability distribution of the left-hand strawberry after passage of a time interval between capture of the first and second images (corresponding to FIGS. 2A and 2B). The greater the similarity between these two probability distributions, the more likely the pair of strawberries are, in fact, the same strawberry captured at two different times.

For example, in FIG. 3, first strawberry $232_1$ on the left has relatively low composite similarity scores with fourth strawberry $232_4$ on the right (0.22) and second strawberry $232_2$ on the right (0.18). This may be because second and fourth strawberries $232_2$, $232_4$ on the right have visual appearances that differ greatly from a predicted visual appearance of first strawberry after passage of the time interval between the first image (FIG. 2A, left side in FIG. 3) and the second image (FIG. 2B, right side in FIG. 3). By contrast, first strawberry $232_1$ on the right has a relatively high composite similarity score (0.98) because its visual appearance is most similar to what the visual appearance of first strawberry $232_1$ would be predicted to be after the passage of the time interval between the first image (FIG. 2A, left side in FIG. 3) and the second image (FIG. 2B, right side in FIG. 3).

To demonstrate, the observed probability distribution of first strawberry $232_1$ on the left is [0.1, 0.5, 0.3, 0.1]. Based on this observed probability distribution, the time interval between capture of the first (FIG. 2A) and second (FIG. 2B) images, and in some cases, additional input such as environmental data (e.g., precipitation, sunlight, temperature) or agricultural management data (e.g., application of irrigation or fertilizer), a subsequent probability distribution may be predicted, e.g., by tracking module 122. Suppose the predicted subsequent probability distribution of first strawberry $232_1$ after passage of the time interval between capture of the first and second images is [0.0, 0.0, 0.1, 0.9]. The observed probability distribution of fourth strawberry $232_4$ on the right is [0.0, 0.1, 0.2, 0.7]. The observed probability distribution of first strawberry $232_1$ on the right is [0.0, 0.0, 0.2, 0.8]. The latter is more similar to the predicted subsequent probability distribution ([0.0, 0.0, 0.1, 0.9]) than the former (e.g., determined using techniques such as Euclidean distance or cosine similarity). Accordingly, first strawberry $232_1$ on the right has the higher composite similarity score.

The composite similarity scores may be computed based on any number of additional signals or inputs besides the similarity between observed and predicted probability distributions over the multiple classes. For example, locations of biological objects across temporally-disparate images can be considered, especially where the images are captured from the same or similar perspectives. Intuitively, visually-distinct strawberries being located at or near the same location across two temporally-disparate images may be probative of those strawberries being a match. Locations of biological objects may be determined in various ways. In implementations where the images are captured from the same or similar perspectives, pixel coordinates of the biological objects and/or bounding boxes around them may be considered. In implementations where the vision sensor used to capture the images includes depth-sensing capabilities, it may be possible to calculate coordinates of the biological objects in three-dimensional (e.g., Euclidean) space. In some implementations, changes in locations that are expected as biological objects evolve may also be accounted for when considering locations. For example, strawberries may gain mass over time, which may lead to them sagging lower in a frame than earlier-stage strawberries.

Other visual features of biological objects may also be considered when calculating composite similarity scores, explicitly via one or more rules and/or implicitly using a statistical (e.g., machine learning) model (separately or using the same model that is used to predict subsequent probability distributions over multiple classes). These other visual features may include, for instance, an overall shape (e.g., outline) of the biological object, a color of the biological object, a visual context of the biological object (e.g., other nearby visual features such as other biological objects, leaves, stems, sprinklers, etc.), a position coordinate of the biological object (e.g., the same strawberry would be expected to be in the same GPS location for as long as the plant remains stationary), etc.

Figure 4:
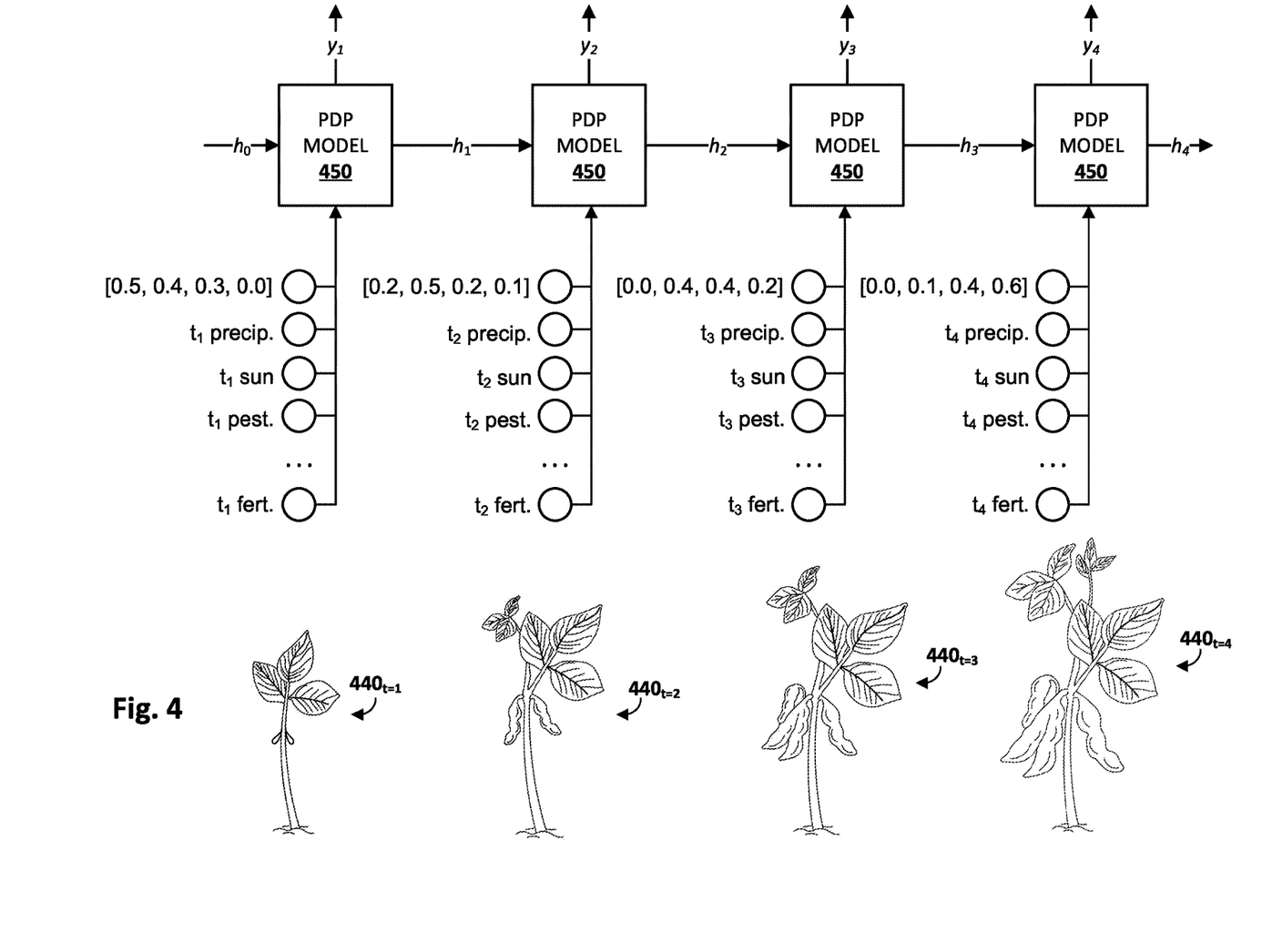
FIG. 4 illustrates how a probability distribution predictor machine learning model may be applied and/or trained, in accordance with various implementations.

FIG. 4 depicts the changing appearance of a plant 440 and/or its constituent parts-of-interest, to illustrate how a time-series machine learning model may be trained and/or applied to predict future probability distributions of a biological object over a plurality of classes. A probability distribution predictor ("PDP" in FIG. 4) model 450 such as an RNN, LSTM, GRU, etc. (any of which may include a CNN), is shown in an "unfolded" state in FIG. 4 to demonstrate how it operates, but it should be understood that in various implementations, PDP 450 may be a single model (or pipeline of models) that is applied during each of multiple iterations. Other models capable of processing sequence may also be employed, such as Bidirectional Encoder Representations from Transformers (BERT) transformer models. Moreover, while future probability distributions are predicted in these examples, this is not meant to be limiting. Techniques described herein could be applied to match biological objects backward in time. Also depicted at bottom is plant 440 at different stages (time t=1, t=2, t=3, t=4) of growth. In FIG. 4, plant 440 takes the form of a bean plant, but this is not meant to be limiting.

At time t=1, PDP 450 receives a null value as prior input $h_0$ because there is no previous iteration input. However, PDP 450 also receives various other data that is used to generate outputs $y_1$ and $h_1$ (the latter which is provided as input during the next iteration). In particular, PDP 450 receives time-series data points for time t==1 that include, for instance, $t_1$ precipitation, $t_1$ sunlight (e.g., minutes or hours of sunlight exposure during a time interval, magnitude of sunlight received, etc.), $t_1$ pesticide application (e.g., whether pesticide was applied during this time interval, an amount of pesticide applied, etc.), and $t_1$ fertilizer application. As indicated by the ellipses, these are only examples of inputs that can be applied across PDP 450 at each iteration. For example, in some implementations, multiple different fungicides, multiple different pesticides, and/or multiple different fertilizers may be applied to an agricultural area during a given day, during a crop cycle, etc. Similar data points are applied at times t=2 to t=4, corresponding to time-series data within the respective time intervals associated with those iterations of PDP 450.

Also applied as input across PDP 450 at each iteration is a current probability distribution over a plurality of classes at a particular stage of the plant's growth cycle. There are four iterations (t=1 to t=4) of PDP 450 depicted in FIG. 4 and four different current probability distributions over a plurality of classes: [0.5, 0.4, 0.3, 0.0], [0.2, 0.5, 0.2, 0.1], [0.0, 0.4, 0.4, 0.2], and [0.0, 0.1, 0.4, 0.6]. In FIG. 4, there are four classes representing four stages of growth, but this is not meant to be limiting.

The probability distributions are applied directly as inputs to the PDP 450 in FIG. 4. This may be because a separate machine learning model (not depicted in FIG. 4), such as a CNN, is applied by inference module 118 to infer the current probability distributions during each iteration first, so that the current probability distribution can be applied as input during that same iteration. However, this is not meant to be limiting. In some implementations, images of the biological objects themselves (or embeddings generated therefrom) may be applied as inputs across PDP 450. In such implementations, the current probability distributions may be inferred using PDP 450 itself based on those images at each iteration.

At each iteration t=i, the corresponding probability distribution may be applied as input across PDP 450, along with other data ($t_i$ precipitation, $t_i$ sunlight, etc.) to generate output $y_i$. In addition, at least some data $h_{t=i-1}$ computed during the previous iteration may be applied as input across PDP 450, in effect giving PDP 450 memory. In the implementation of FIG. 4, the output $y_i$ at each iteration t=i may be, for instance, a predicted probability distribution for the next iteration. Alternatively, if images of the biological object are provided as inputs at each iteration i, then the output $y_i$ at each iteration i may be the observed probability distribution inferred from that image.

If PDP 450 is undergoing training, then training annotations or labels may be available in the form of known (or "ground truth") probability distributions over the plurality of classes. Whatever form the training annotations or labels, they may be compared to the output y at each iteration to generate a difference or error. This difference or error may be used to train PDP 450, e.g., using techniques such as back propagation and/or gradient descent.

Ground truth probability distributions may be relatively sparse because ground truth images of biological objects may be sparse. For example, ground truth training images may be captured of crops at intervals that are, temporally speaking, relatively far removed from each other (e.g., every two weeks, every thirty days, etc.). Even where more temporally-frequent images are available, processing large numbers of images using machine learning models to infer observed probabilities may be time-consuming and/or impractical. Accordingly, in some implementations—especially where probability distributions, and not images, are applied as input across PDP 450—intermediate probability distributions may be interpolated, e.g., based on a trajectory between "keyframe" ground truth observed probability distributions inferred from keyframe images. These keyframe images may be selected from supersets of temporal sequences, e.g., to conserve computing resources that would otherwise be used to infer probability distributions for all the images of the temporal sequence. Additionally or alternatively, sparse ground truth images may simply be used as keyframes.

In FIG. 4, for instance, it might be the case that the probability distributions at times $t_1$ and $t_3$ are actually calculated by inference module 118 by applying a CNN (e.g., the aforementioned PDC) to keyframe ground truth images. The probability distributions at times $t_2$ and $t_4$ may be interpolated. Interpolating probability distributions in this manner may enable PDP 450 to predict subsequent probability distributions more granularly than if PDP 450 were trained exclusively on keyframe ground truth images. For example, if keyframe ground truth training images are only captured every thirty days, but probability distributions are interpolated daily, then it is possible to predict subsequent probability distributions at any given day, rather than only for the days at which keyframe ground truth images were captured.

Figure 5:
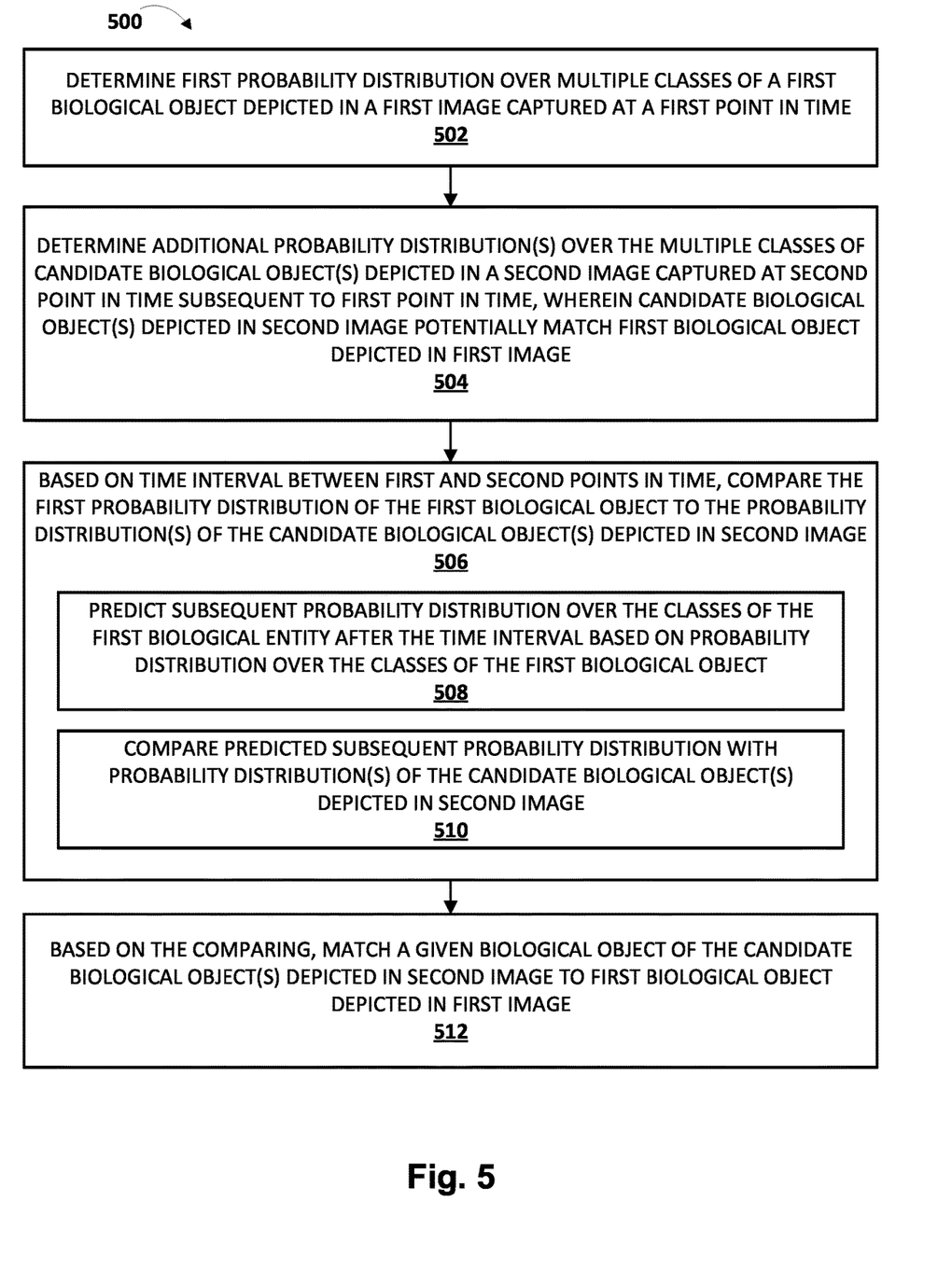
FIG. 5 is a flowchart of an example method in accordance with various implementations described herein.

FIG. 5 illustrates a flowchart of an example method 50) for practicing selected aspects of the present disclosure during an inference phase. The operations of FIG. 5 can be performed by one or more processors, such as one or more processors of the various computing devices/systems described herein, such as by plant knowledge system 104.

For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 502, the system, e.g., by way of inference module 118, may determine a first probability distribution over a plurality of classes of a first biological object depicted in a first image captured at a first point in time, e.g., using the PDC machine learning model described previously. In various implementations, the plurality of classes may represent stages of growth of biological objects of the same type as the first biological object. As noted previously, biological objects may include any living thing or constituent part of a living thing. For example, entire plants and/or their constituent parts of economic and/or nutritional interest may have appearances that change over time, and therefore can be tracked across temporally-disparate images using techniques described herein.

At block 504, the system, e.g., by way of inference module 118 using the aforementioned PDC machine learning model, may determine one or more additional probability distributions over the plurality of classes of one or more candidate biological objects depicted in a second image. In various implementations, the one or more candidate biological objects depicted in the second image potentially match the first biological object depicted in the first image, except they may appear differently because the second image may be captured at a second point in time that is substantially different than the first point in time, e.g., days or weeks later.

Based on a time interval between the first and second points in time (e.g., days or weeks in many cases), at block 506, the system, e.g., by way of tracking module 122, may compare the first probability distribution of the first biological object to the one or more probability distributions of the one or more candidate biological objects depicted in the second image. For example, at block 508, tracking module 122 may predict, e.g., using PDP 450, a subsequent probability distribution over the plurality of classes of the first biological entity after the time interval based on the probability distribution over the plurality of classes of the first biological object.

At block 510, tracking module 122 may compare the predicted subsequent probability distribution with the one or more probability distributions of the one or more candidate biological objects depicted in the second image. Based on the comparing at block 506 (and at block 510 where applicable), at block 512, the system, e.g., by way of tracking module 122, may match a given biological object of the one or more candidate biological objects depicted in the second image to the first biological object depicted in the first image.

Figure 6:
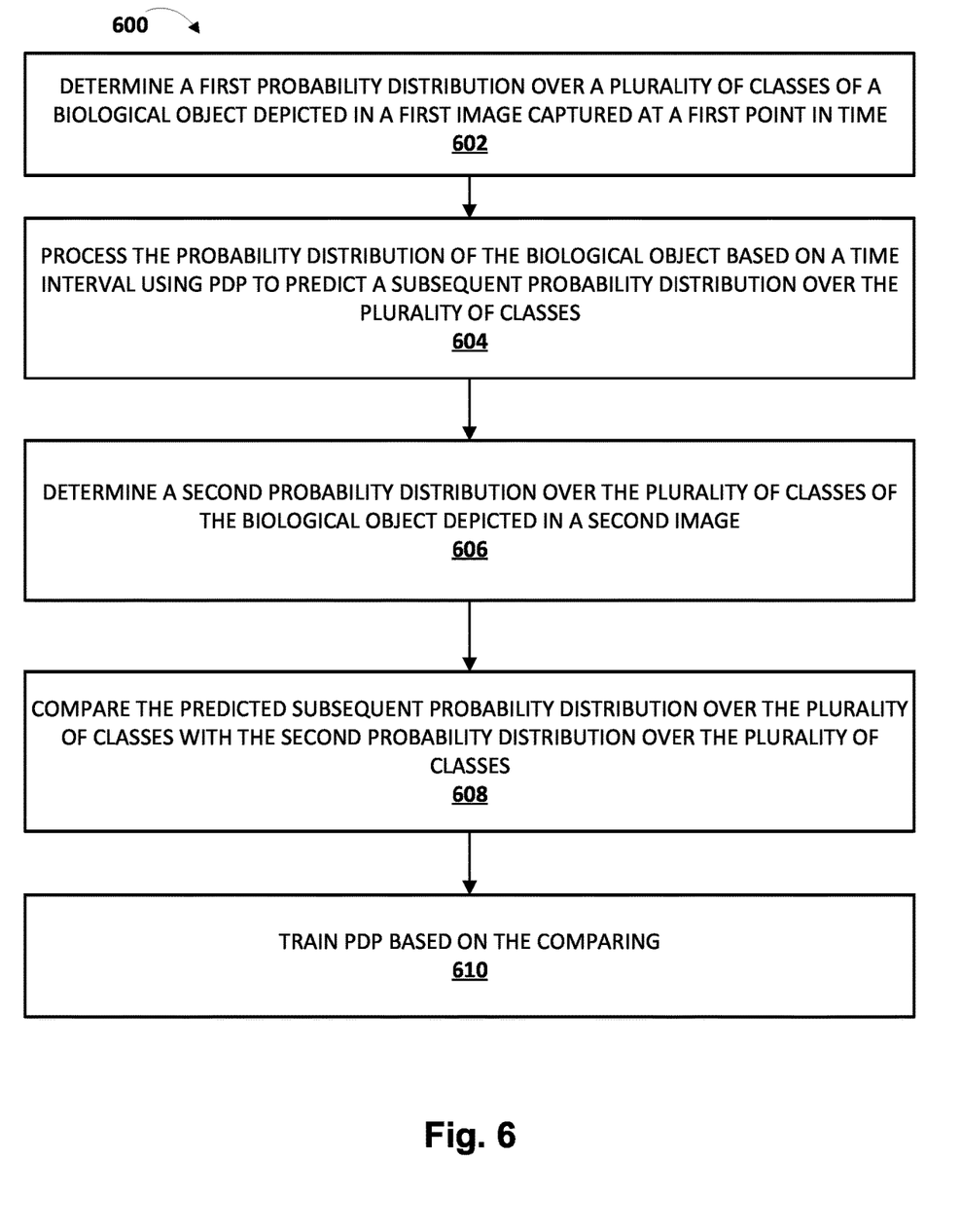
FIG. 6 is a flowchart of an example method in accordance with various implementations described herein.

FIG. 6 illustrates a flowchart of an example method 600 for practicing selected aspects of the present disclosure during a training phase. The operations of FIG. 6 can be performed by one or more processors, such as one or more processors of the various computing devices/systems described herein, such as by plant knowledge system 104. For convenience, operations of method 600 will be described as being performed by a system configured with selected aspects of the present disclosure. Other implementations may include additional operations than those illustrated in FIG. 6, may perform step(s) of FIG. 6 in a different order and/or in parallel, and/or may omit one or more of the operations of FIG. 6.

At block 602, the system, e.g., by way of inference module 118, may determine a first probability distribution over a plurality of classes of a biological object depicted in a first image captured at a first point in time. As before, the plurality of classes may represent stages of growth of biological objects. At block 604, the system, e.g., by way of tracking module 122, may process the probability distribution of the biological object based on a time interval using PDP 450 to predict a subsequent probability distribution over the plurality of classes.

At block 606, the system, e.g., by way of inference module 118, may determine a second probability distribution over the plurality of classes of the biological object depicted in a second image. Similar to before, the second image may be captured at a second point in time that occurs subsequent to the first point in time, after passage of the time interval. At block 608, the system. e.g., by way of tracking module 122, may compare the predicted subsequent probability distribution over the plurality of classes with the second probability distribution over the plurality of classes. Based on the comparison, at block 610, the system may train PDP 450, e.g., using techniques such as back propagation, gradient descent, etc.

Figure 7:
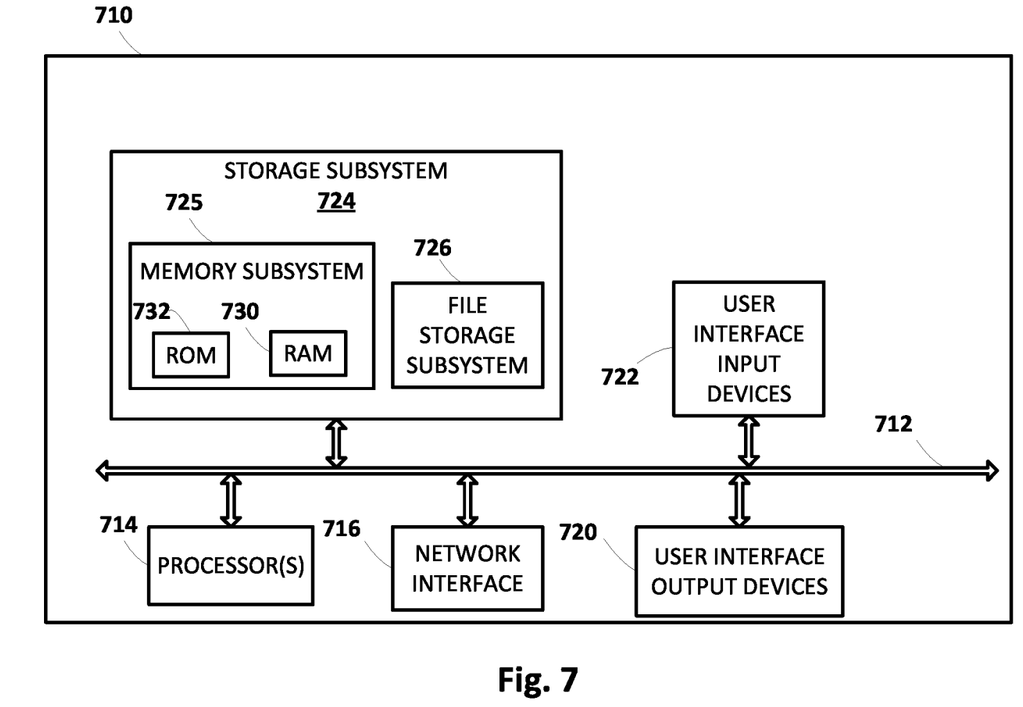
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 710 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of methods 500 and 600 described herein, as well as to implement various components depicted in FIGS. 1 and 4.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple buses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   determining a first probability distribution over a plurality of classes of a first biological object depicted in a first image captured at a first point in time;
   determining one or more additional probability distributions over the plurality of classes of one or more candidate biological objects depicted in a second image, wherein the one or more candidate biological objects depicted in the second image potentially match the first biological object depicted in the first image, and wherein the second image is captured at a second point in time that differs from the first point in time;
   predicting a probability distribution over the plurality of classes of the first biological object at the second point in time based at least in part on the probability distribution over the plurality of classes of the first biological object; and
   comparing the predicted probability distribution to the one or more additional probability distributions of the one or more candidate biological objects depicted in the second image to match a given biological object of the one or more candidate biological objects depicted in the second image to the first biological object depicted in the first image.

2. The method of claim 1, wherein the one or more candidate biological objects include fruits, flowers, or berries, and the plurality of classes include two or more of flowering, ripening, growing, or branching.

3. The method of claim 1, wherein the predicting includes processing the probability distribution of the first biological object based on a time interval between the first and second points in time using a probability distribution predictor (PDP) machine learning model, wherein the PDP machine learning model is trained to map temporally disparate probability distributions of biological objects to each other based on time intervals between the temporally disparate probability distributions.

4. The method of claim 3, wherein the PDP machine learning model includes a recurrent neural network.

5. The method of claim 3, wherein the PDP machine learning model includes a transformer network.

6. The method of claim 1, wherein the plurality of classes represent stages of growth of biological objects.

7. The method of claim 1, wherein the plurality of classes represent different colors of biological objects.

8. A system comprising one or more processors and memory storing instructions that, in response to execution by the one or more processors, cause the one or more processors to:
   determine a first probability distribution over a plurality of classes of a first biological object depicted in a first image captured at a first point in time;
   determine one or more additional probability distributions over the plurality of classes of one or more candidate biological objects depicted in a second image, wherein the one or more candidate biological objects depicted in the second image potentially match the first biological object depicted in the first image, and wherein the second image is captured at a second point in time that differs from the first point in time;
   predict a probability distribution over the plurality of classes of the first biological object at the second point in time based at least in part on the probability distribution over the plurality of classes of the first biological object; and
   compare the predicted probability distribution to the one or more additional probability distributions of the one or more candidate biological objects depicted in the second image to match a given biological object of the one or more candidate biological objects depicted in the second image to the first biological object depicted in the first image.

9. The system of claim 8, wherein the one or more candidate biological objects include fruits, flowers, or berries, and the plurality of classes include two or more of flowering, ripening, growing, or branching.

10. The system of claim 8, wherein the instructions to predict include instructions to process the probability distribution of the first biological object based on a time interval between the first and second points in time using a probability distribution predictor (PDP) machine learning model, wherein the PDP machine learning model is trained to map temporally disparate probability distributions of biological objects to each other based on time intervals between the temporally disparate probability distributions.

11. The system of claim 10, wherein the PDP machine learning model includes a recurrent neural network.

12. The system of claim 10, wherein the PDP machine learning model includes a transformer network.

13. The system of claim 8, wherein the plurality of classes represent stages of growth of biological objects.

14. The system of claim 8, wherein the plurality of classes represent different colors of biological objects.

15. At least one non-transitory computer-readable medium comprising instructions that, in response to execution by one or more processors, cause the one or more processors to:
   determine a first probability distribution over a plurality of classes of a first biological object depicted in a first image captured at a first point in time;
   determine one or more additional probability distributions over the plurality of classes of one or more candidate biological objects depicted in a second image, wherein the one or more candidate biological objects depicted in the second image potentially match the first biological object depicted in the first image, and wherein the second image is captured at a second point in time that differs from the first point in time;
   predict a probability distribution over the plurality of classes of the first biological object at the second point in time based at least in part on the probability distribution over the plurality of classes of the first biological object; and
   compare the predicted probability distribution to the one or more additional probability distributions of the one or more candidate biological objects depicted in the second image to match a given biological object of the one or more candidate biological objects depicted in the second image to the first biological object depicted in the first image.

16. The at least one non-transitory computer-readable medium of claim 15, wherein the one or more candidate biological objects include fruits, flowers, or berries, and the plurality of classes include two or more of flowering, ripening, growing, or branching.

17. The at least one non-transitory computer-readable medium of claim 15, wherein the instructions to predict include instructions to process the probability distribution of the first biological object based on a time interval between the first and second points in time using a probability distribution predictor (PDP) machine learning model, wherein the PDP machine learning model is trained to map temporally disparate probability distributions of biological objects to each other based on time intervals between the temporally disparate probability distributions.

18. The at least one non-transitory computer-readable medium of claim 17, wherein the PDP machine learning model includes a recurrent neural network.

19. The at least one non-transitory computer-readable medium of claim 17, wherein the PDP machine learning model includes a transformer network.

20. The at least one non-transitory computer-readable medium of claim 15, wherein the plurality of classes represent stages of growth of biological objects.

* * * * *